US008594198B2

(12) United States Patent
Xi

(10) Patent No.: US 8,594,198 B2
(45) Date of Patent: Nov. 26, 2013

(54) METHOD OF IMPLEMENTING INTRA PREDICTION COMPUTATION APPLIED TO H.264 DIGITAL VIDEO CODING AND DEVICE

(75) Inventor: He Xi, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 609 days.

(21) Appl. No.: 12/752,981

(22) Filed: Apr. 1, 2010

(65) Prior Publication Data

US 2010/0254457 A1    Oct. 7, 2010

(30) Foreign Application Priority Data

Apr. 1, 2009    (CN) .......................... 2009 1 0131490

(51) Int. Cl.
*H04N 7/32* (2006.01)
(52) U.S. Cl.
USPC .................................................... 375/240.12
(58) Field of Classification Search
USPC .................................................... 375/240.12
See application file for complete search history.

(56) References Cited

U.S. PATENT DOCUMENTS

| | | | |
|---|---|---|---|
| 6,882,688 B1* | 4/2005 | Oohashi et al. .......... | 375/240.24 |
| 2006/0259536 A1* | 11/2006 | Hong et al. ................ | 708/670 |
| 2007/0133891 A1* | 6/2007 | Jeong ........................ | 382/238 |
| 2008/0063047 A1* | 3/2008 | Guo et al. .................. | 375/240 |
| 2009/0147849 A1* | 6/2009 | Au et al. .................... | 375/240.13 |

OTHER PUBLICATIONS

Kim, J. et al., "Implementation of High Performance Intra Predictor in H.264," XIII Workshop IBERCHIP, Mar. 16, 2007, pp. 343-344.
Office Action from Chinese Patent Application No. 200910131490.8, dated Jan. 30, 2012.
Office Action from Chinese Patent Application No. 200910131490.8, dated Jun. 8, 2012.

* cited by examiner

*Primary Examiner* — Tung Vo
*Assistant Examiner* — Obafemi Sosanya
(74) *Attorney, Agent, or Firm* — Zilka-Kotab, PC

(57) ABSTRACT

The present invention provides a method of implementing an intra prediction computation applied to the H.264 digital video coding and a device. The method according to present invention of implementing the intra prediction computation applied to the H.264 video coding comprises selecting an image block to be intra-predicted and extracting the neighboring pixel values of said block; determining the prediction mode of said block, and perform first adding operation on said neighboring pixel values when the prediction mode is one of Diagonal_Down_Left, Diagonal_Down_Right, Vertical_Right, Horizontal_Down, Vertical_Left, and Horizontal_Up; performing first shifting operation and second adding operation on the result of first adding operation respectively; performing second shifting operation on the result of second adding operation; selecting a corresponding value to output from the results of first and second shifting operation according to said prediction mode and size of block. The method and circuit device according to present invention will decrease most of the repeated calculations and improve the efficiency without greatly increasing the required chip real estate area.

19 Claims, 11 Drawing Sheets

METHOD OF IMPLEMENTING INTRA PREDICTION COMPUTATION APPLIED TO H.264 DIGITAL VIDEO CODING AND DEVICE

RELATED APPLICATION(S)

The present invention claims priority to CN Patent Application No. 200910131490.8, filed Apr. 1, 2009, which is hereby incorporated by reference.

FIELD OF INVENTION

The present invention relates to intra prediction techniques used in video compression, and more particularly to a method of implementing intra prediction computation applied to the H.264 digital video coding standard and a device for implementing the same

BACKGROUND

During digital video data transmitting, especially in real time transmitting, as well as in storing such data, the amount of raw video data tends to be rather large and thus needs to be compressed by data compression and coding processes. Standards for video coding have been developed since the 1990s starting from MPEG-1, MPEG-2 and H.261, H.263 to the H.264 as the present standard. H.264 is an international standard for digital video compression newly developed by the Joint Video Team (JVT), which is co-founded by the ITU-T Video Coding Experts Group (VCEG) and the ISO/IEC Moving Picture Experts Group (MPEG). The H.264 standard can provide a better quality in video transmission with lower bandwidth, which has brought the video compression technique into a higher level. The applications of H.264 have gradually spread into many fields, such as low code rate wireless transmission, standard definition and high definition TV broadcasting, Internet Video Streaming, high definition DVD video transmission, high quality digital camera video, etc.

Intra prediction is an important part of the video compression technique in the H.264 standard. In H.264, the video is comprised of images with multiple frames. Each frame of the image can be divided into a plurality of macroblocks ("MBs"). Intra prediction is performed on one single macroblock, uses available pixels of neighboring data blocks to predict the pixel value in the current data block in different directions, and encodes and stores the difference between the real pixel value and the predicted pixel value of the current data block. The method is unique to the H.264 standard and especially useful in the flat background or parallel lines of an image where spatial redundancy often exists.

In the H.264 standard, there are four intra prediction types of blocks: I4×4, I8×8, I16×16 luma blocks and 8×8 chroma blocks. There are nine prediction modes for I4×4 and I8×8 blocks, i.e., Vertical (V), Horizontal (H), DC, Diagonal_Down_Left, Diagonal_Down_Right, Vertical_Right, Horizontal_Down, Vertical_Left, and Horizontal_Up. FIG. 1 uses I4×4 block as an example to show the nine prediction modes. Specifically, A to M denotes the neighboring pixels of a current block undergoing intra prediction; grey area indicates the pixels of current block to be predicted. Regarding I16×16 block and chroma blocks, there are only four prediction modes: Vertical, Horizontal, DC, and Plane mode. Among these modes, Vertical, Horizontal, and DC modes are the same as those for I4×4 block. The H.264 standard provides methods and equations for calculating the predicted pixel values for every single mode of block in all different sizes. For example, for a I4×4 block with the prediction mode of Diagonal_Down_Left, the value of the prediction pixel $Predictor_{4x4L}[x, y]$, with x, y=0 . . . 3 are derived as follows:

If x is equal to 3 and y is equal to 3, $$Predictor_{4x4L}[x,y]=(P[6,-1]+3*P[7,-1]+2)>>2$$

Otherwise (x is not equal to 3 or y is not equal to 3), $$Predictor_{4x4L}[x,y]=(P[x+y,-1]+2*P[x+y+1,-1]+P[x+y+2,-1]+2)>>2$$

wherein P[m,n] denotes the values of neighboring pixels of the current block to be predicted, m=−1, . . . , 7, denotes the locations of the neighboring pixels M, A, B, C, D, E, F, G and H as shown in FIG. 1, respectively, and n=−1, . . . , 3, denotes the locations of the neighboring pixels I, J, K and L as shown in FIG. 1, respectively.

To start an intra prediction process, as for a divided block, according to the size of the block and the prediction mode, corresponding equations given in the H.264 standard are chosen to calculate predicted pixel values, and then the calculated pixel values are selected according to a predetermined mode and assigned to the current prediction block. It can be seen from above that the amount of computation in the intra prediction process is very large. In existing designs, a datapath having a single form is usually utilized to do the computation for all prediction modes. Such a datapath can only calculate one predicted pixel once, thus the efficiency is quite low. If calculation for multiple predicted pixels at one time is desired, which mean enlarging the bandwidth of the datapath, the only way is to assign such a datapath for each predicted pixel, which will cause a large chip real estate area cost and yield a large amount of redundant circuit units. Moreover, most of the equations in calculating the predicted pixel in H.264 standard are the same for different blocks/prediction modes, therefore, the existing designs will produce a large amount of redundant computation, and thereby decrease the computational efficiency.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, it is therefore an object of the present invention to provide a method of implementing the intra prediction computation applied to the H.264 digital video coding standard where most of the calculations based on the same equations in H.264 are combined and performed in parallel. Thus, this method will decrease most of the repeated calculations and greatly improve the efficiency without greatly increasing the required chip real estate area.

The present invention provides a method of implementing the intra prediction computation applied to the H.264 video coding standard. First, an image block to be intra-predicted is selected and the neighboring pixel values of the block are extracted. The prediction mode of the block is then determined and a first adding operation is performed on the neighboring pixel values if the prediction mode is one of Diagonal_Down_Left, Diagonal_Down_Right, Vertical_Right, Horizontal_Down, Vertical_Left, or Horizontal_Up. A first shifting operation and second adding operation are then performed on the result of the first adding operation and likewise, a second shifting operation is performed on the result of second adding operation. A corresponding value is then selected to output from the results of first and second shifting operation according to the prediction mode and the size of the block. The first adding operation may be calculated according to following equation: Predictor=P[n−1]+P[n]+1, where Predictor is a predicted value for a pixel, P[n] is the value of neighboring pixel, n=1, . . . , Max, denoting each neighboring pixel from the bottom left corner to the upper right corner of the block.

The second adding operation may be performed according to the following equations:

Predictor=$P[n-1]+2*P[n]+P[n+1]+2$ (if n=1, . . . , Max−1)

Predictor=$3*P[0]+P[1]+2$ (if n=0)

Predictor=$P[\text{Max}-1]+3*P[\text{Max}]+2$ (if n=Max)

wherein Predictor is a predicted value for a pixel, P[n] is the value of neighboring pixel, and n=1, . . . , Max, denotes each neighboring pixel from the bottom left corner to the upper right corner of the block. The first shifting operation may perform right-shifting by 1 bit and the second shifting operation may perform right-shifting by 2 bits. The method may also include a step of calculating a predicted value for a pixel based on the neighboring pixel values when the prediction mode is one of Horizon, Vertical, DC and Plane mode.

The present invention additionally provides a circuit device for implementing the intra prediction computation applied to the H.264 video coding standard according to the method above. A graphics processing unit (GPU) may also include the circuit device described above and a graphics card may also include this GPU.

Other features and embodiments are described below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
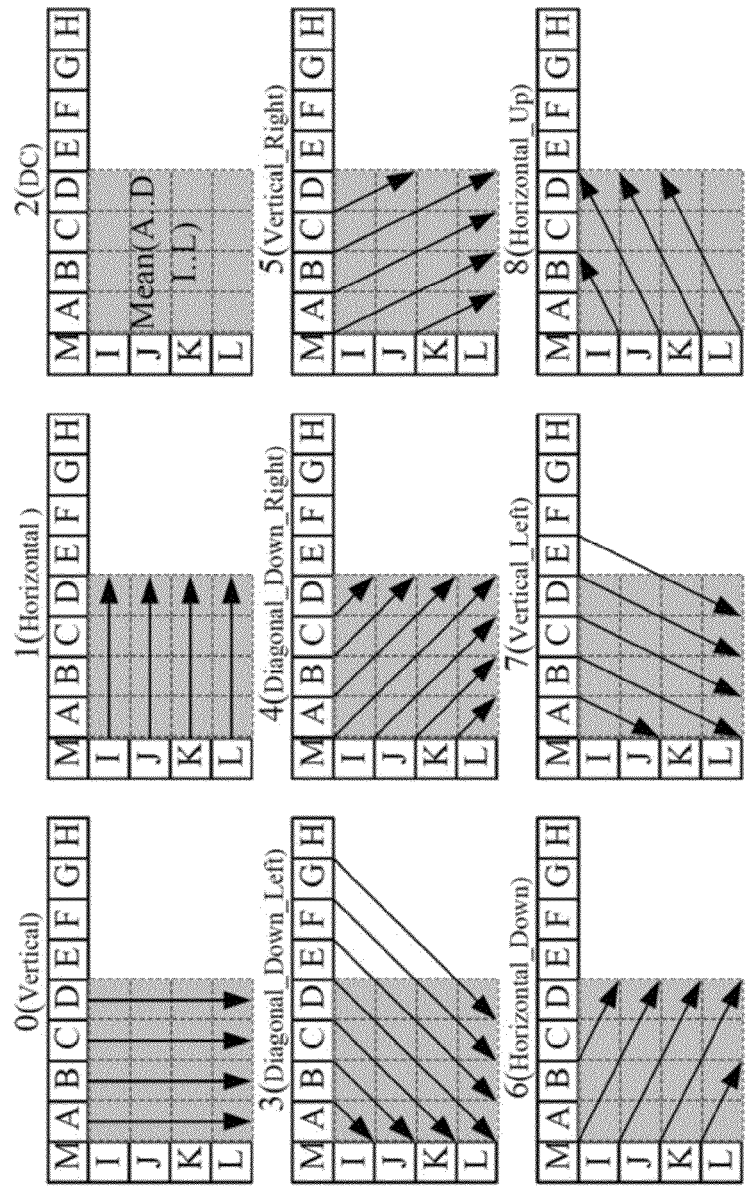
FIG. 1 shows nine (9) prediction modes for the I4×4 block.

In the following description, numerous specific details are set forth to provide a more thorough understanding of the present invention. However, it will be apparent to one of skill in the art that the present invention may be practiced without one or more of these specific details. In other instances, certain well-known features have not been described in order to avoid obscuring the present invention.

Among the ten (10) intra prediction modes under the H.264 standard, the computation for the following four prediction modes Horizontal, Vertical, DC and Plane modes are relatively simple than that for other six (6) prediction modes. The computation equations provided by the H.264 standard for the other 6 prediction modes, i.e., Diagonal_Down_Left, Diagonal_Down_Right, Vertical_Right, Horizontal_Down, Vertical_Left, and Horizontal_Up, can be summarized by the following four predictor equations:

$$\text{Predictor}=(P[n-1]+P[n]+1)>>1 \quad (1)$$

$$\text{Predictor}=(P[n-1]+2*P[n]+P[n+1]+2)>>2 \quad (2)$$

$$\text{Predictor}=(3*P[0]+P[1]+2)>>2 \quad (3)$$

$$\text{Predictor}=(P[\text{Max}-1]+3*P[\text{Max}]+2)>>2 \quad (4)$$

wherein Predictor is a predicted value for a pixel, P[n] denotes the value of the neighboring pixel, n=0, . . . , Max denotes the neighboring pixels starting from the bottom left corner to the upper right corner, P[0] denotes the value of the neighboring pixel at the bottom left corner, and P[Max] denotes the value of the neighboring pixel at the upper right corner. To simplify the denotation, the predicted pixel P[x,y], which is a two dimensional coordinate denotation in the H.264 standard, will be replaced and denoted by one a dimensional coordinate P[n] throughout the present disclosure, wherein P[n−1] and P[n] denote the two values of the neighboring pixels. For an I4×4 block, this corresponding relationship between two dimensional and one dimensional denotations is shown in table 1 below:

TABLE 1 the corresponding relationship between two dimensional and one dimensional denotations of neighboring pixels in I4 × 4 block.

| Two dimensional denotation | One dimensional denotation |
| --- | --- |
| P[−1, 3] | P[0] |
| P[−1, 2] | P[1] |
| P[−1, 1] | P[2] |
| P[−1, 0] | P[3] |
| P[−1, −1] | P[4] |
| P[0, −1] | P[5] |
| P[1, −1] | P[6] |
| P[2, −1] | P[7] |
| P[3, −1] | P[8] |
| P[4, −1] | P[9] |
| P[5, −1] | P[10] |
| P[6, −1] | P[11] |
| P[7, −1] | P[12] |

The corresponding relationship between two dimensional and one dimensional denotations of neighboring pixels in I8×8 block is similar to that in I4×4 block, so that detailed description is omitted herein.

It can be seen that the above equations (1) and (2) are in a general form for calculating predictors when n=1, . . . , Max−1, whereas equations (3) and (4) are in a form for calculating end values when performing equation (2), wherein n=0 and n=Max.

After transforming the above equation (2), another form is shown below:

$$\text{Predictor}=\{(P[n-1]+P[n]+1)+(P[n]+P[n+1]+1)\}>>2 \quad (2')$$

As shown above, the calculated result of equation (2') before being logically right-shifted by 2 bits, i.e., the result of the calculation in the curly brackets, is actually the sum of two parts, (P[n−1]+P[n]+1) and (P[n]+P[n+1]+1), which two parts can be obtained directly from an intermediate operation result of equation (1) when n=n−1 and n. Therefore, there is no need to design a separate complex circuit for performing equation (2'). Instead, only one adder is needed for calculating equation (2'). This adder will take two results coming from equation (1) as inputs and then the final result will be obtained by logically shifting the output of the adder. The computation of equation (1) only involves one addition (the operation of "plus 1" (+1) can be achieved by the carry-in function of the adder itself, and there is no need for a separate adder for it) and one logical shifting. Therefore, only two levels of addition operations together with separate calculations for the end values using equations (3) and (4) can generate all the predicted pixel values under all prediction modes except for those under Vertical, Horizontal, DC, and Plane mode at one time.

Figure 2:
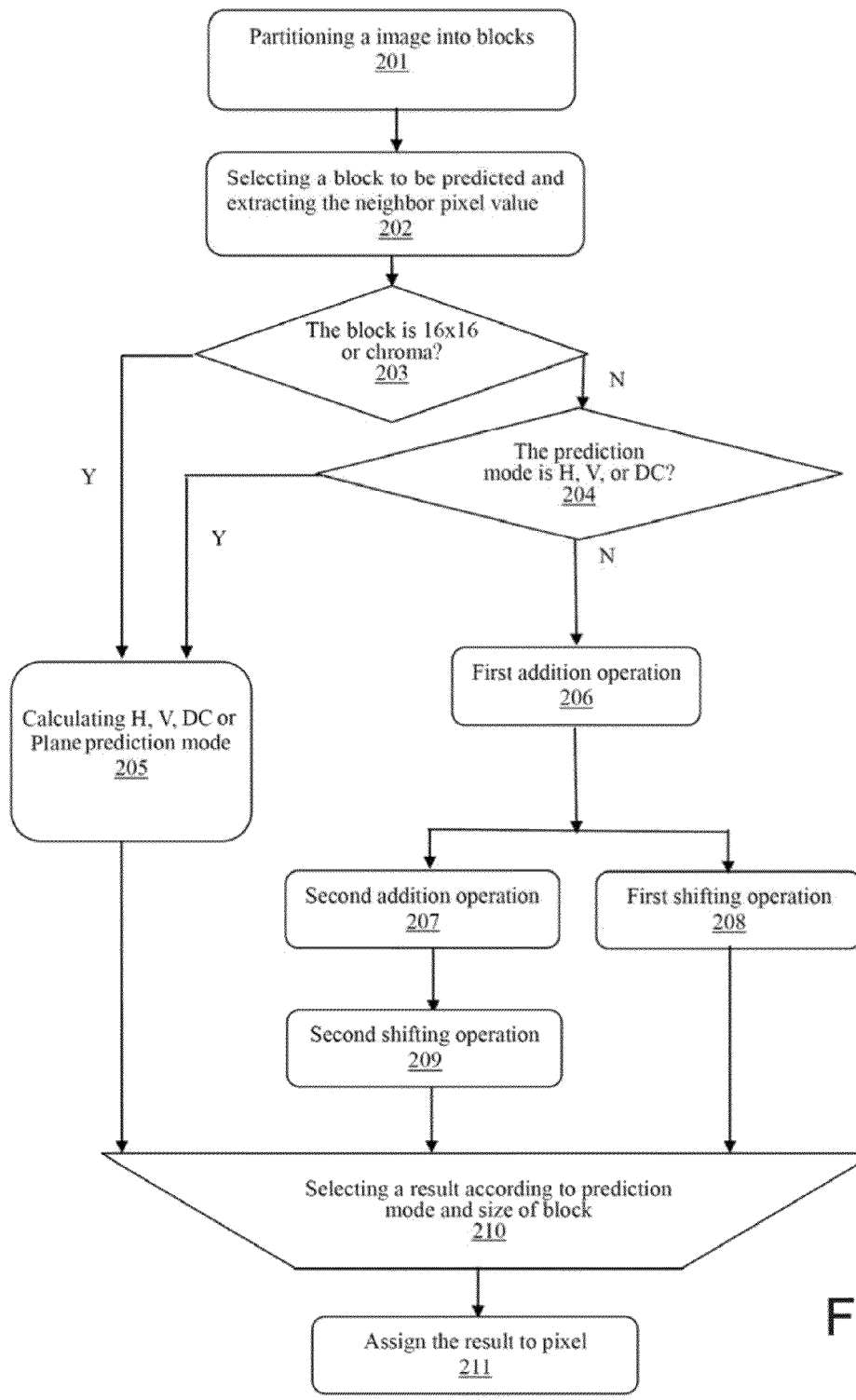
FIG. 2 is a flow chart illustrating the intra prediction method according to the present invention.

Referring next to FIG. 2, shown is a flow chart illustrating the intra prediction method according to the present invention. As shown in FIG. 2, in step 201, an image frame is divided into several blocks. At step 202, select the current block to be intra-predicted and extract the available neighboring pixel values of the current block. In step 203, determine whether the current block is an I16×16 block or an I8×8 chroma block. When it is determined that the current block is either an I16×16 block or an I8×8 chroma block, go to step 205 directly to carry out computations for Vertical, Horizontal, DC, and Plane prediction modes since both I16×16 block and I8×8 chroma block only have these four prediction modes, and these four modes will not utilize the above "two-level-addition" process. Go to step 204 when it is determined that the current block is neither an I16×16 block nor an I8×8 chroma block, and then determine the prediction mode. If the determined prediction mode is one of Vertical, Horizontal, or DC, go to step 205 to carry out the corresponding computation. Otherwise, if the prediction mode is one of Diagonal_Down_Left, Diagonal_Down_Right, Vertical_Right, Horizontal_Down, Vertical_Left, or Horizontal_Up, then go to step 206 and enter the "double-level-addition" computation process described herein. At step 206, use the extracted neighboring pixels in step 202 as the inputs for the first addition operation and calculate according to equation (I) to carry out the "(P[n−1]+P[n]+1)" part of equation (1). The operation of "+1" can be accomplished by using the carry-in function of the adder. The result of the first addition operation in step 206 is then output to the second addition operation in step 207 and to the first shifting operation in step 208, respectively. In step 208, right shift the result from step 206 by 1 bit, thereby finishing the computation according to equation (1) and then output the final result to step 210. At step 207, carry out second addition operation using the results of step 206 as inputs according to equation (2'), and then obtain the sum of (P[n−1]+P[n]+1)+(P[n]+P[n+1]+1). Output the results of step 207 to the second shifting operation in step 209. In step 209, right shift the results from step 207 by 2 bits, thereby finishing the computation according to equation (2') and output the final results to step 210. Finally in step 210, select a value from the results of step 205, step 208, or step 209 according to the prediction mode and the size of the current block and assign the selected value to the predicted pixels in step 211. The intra prediction process is then completed.

It is apparent from the above process that there are an abundant amount of identical equations for different prediction modes and that there are common parts in these equations. Using the method according present invention, the identical and common parts of these equations are combined into a simple two-level-addition computation, thereby reducing a large amount of redundant computations.

Figure 3:
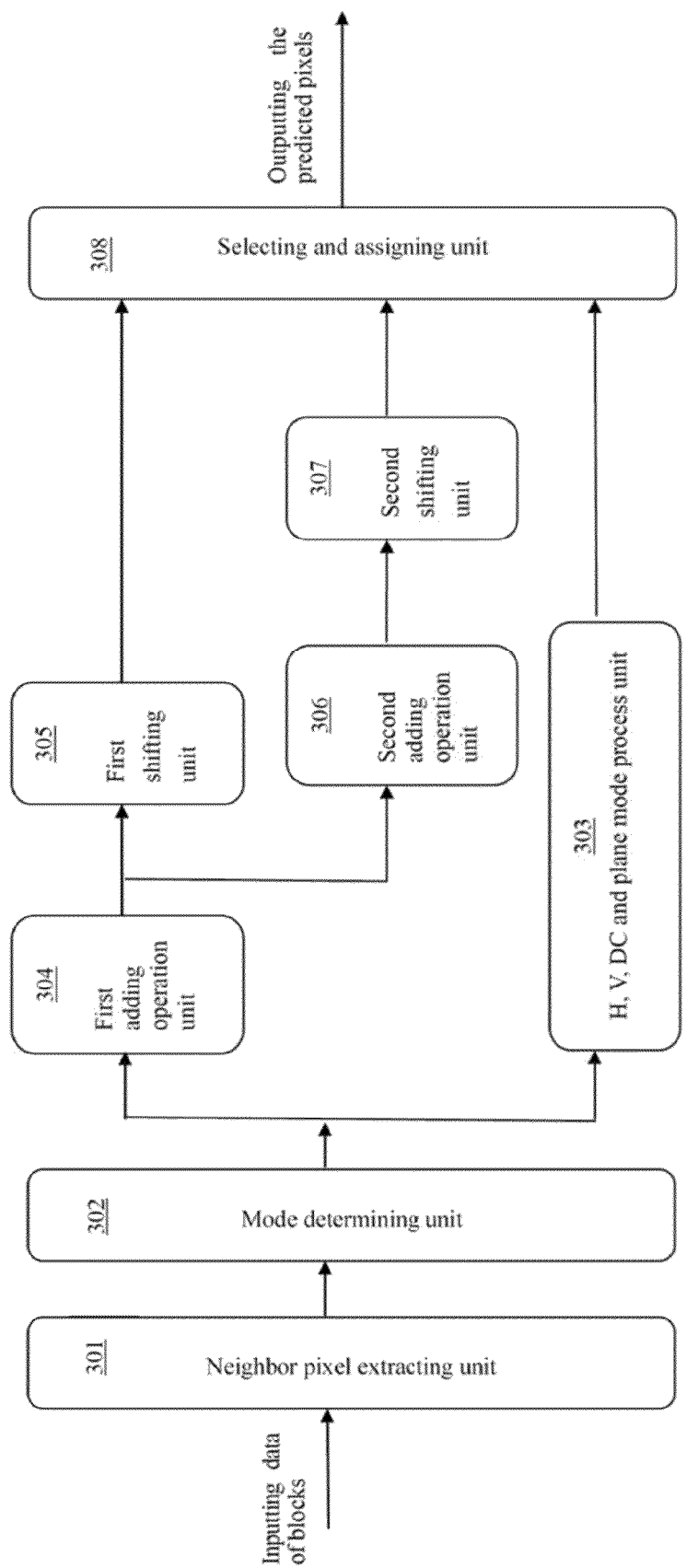
FIG. 3 is a block diagram of the circuit device implementing the intra prediction method according to the present invention.

Referring next to FIG. 3, shown is a block diagram of the circuit device implementing the intra prediction method according to the present invention. According to FIG. 3, firstly, input the image data from the divided block into the neighboring pixel extracting unit 301 and extract the available neighboring pixels of the current block to be intra-predicted from the data. Then go to the mode determining unit 302 to determine whether the prediction mode is any one of Vertical, Horizontal, DC, and Plane. If the prediction mode is any one of Vertical, Horizontal, DC, and Plane, then input the available neighboring pixels to the Vertical, Horizontal, DC, and Plane mode process unit 303 to carry out corresponding calculations. The results obtained at unit 303 are output directly to the selection and assignment unit 308. Otherwise, if the prediction mode is one of Diagonal_Down_Left, Diagonal_Down_Right, Vertical_Right, Horizontal_Down, Vertical_Left, or Horizontal_Up, then the available neighboring pixel values are input into the first adding operation unit 304 to carry out the first level addition, that is, to complete the "(P[n−1]+P[n]+1)" portion of equation (1). The "+1" operation can be obtained through the adders in the first adding operation unit 304 with a carry-in function. The results from unit 304 are output to a first shifting unit 305 and to a second adding operation unit 306 respectively. In the first shifting unit 305, the results from unit 304 are right shifted by 1 bit, thereby completing the operation according to equation (1). The results of the first shifting unit 305 are output to the selection and assignment unit 308. In the second adding operation unit 306, the computation of "{(P[n−1]+P[n]+1)+(P[n]+P[n+1]+1)}" portion of equation (2') is carried out. This result is output to a second shifting unit 307 to be right shifted by 2 bits. The right shifted result is also output to the selection and assignment unit 308. In the selection and assignment unit 308, the corresponding values are selected from these results according to the prediction mode and the size of the current block, and then assigned to each specific pixel in the current block to generate the intra prediction result. As a result, the intra prediction process is completed.

Exemplary Embodiment 1

Figure 4A:
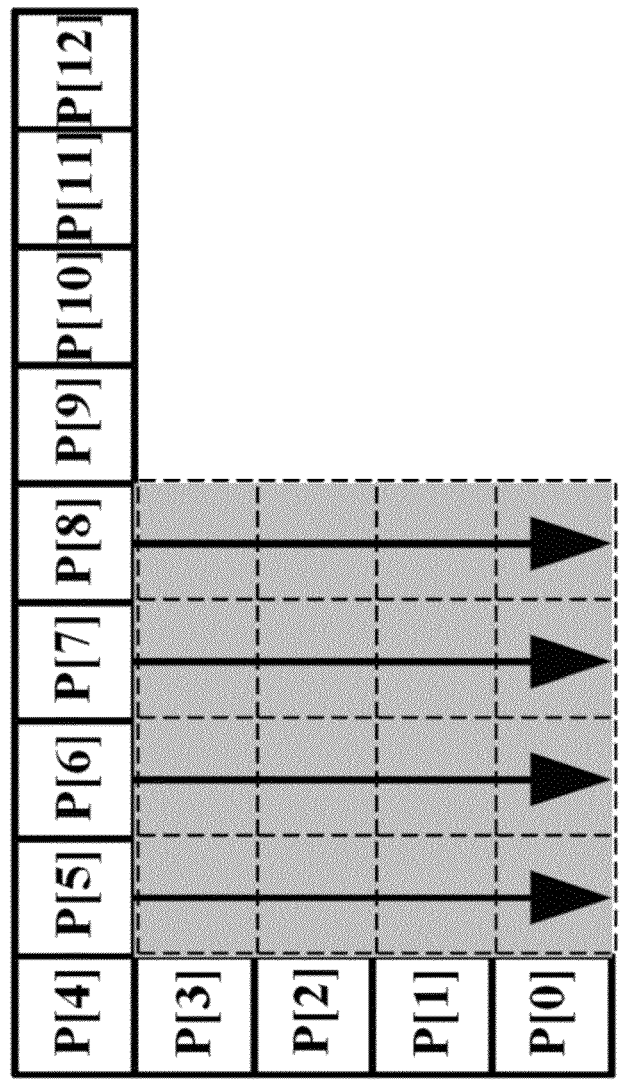
FIGS. 4a through 4c show the datapath for an I4×4 block applying a method of implementing the intra prediction calculation according to the present invention.
Figure 4B:
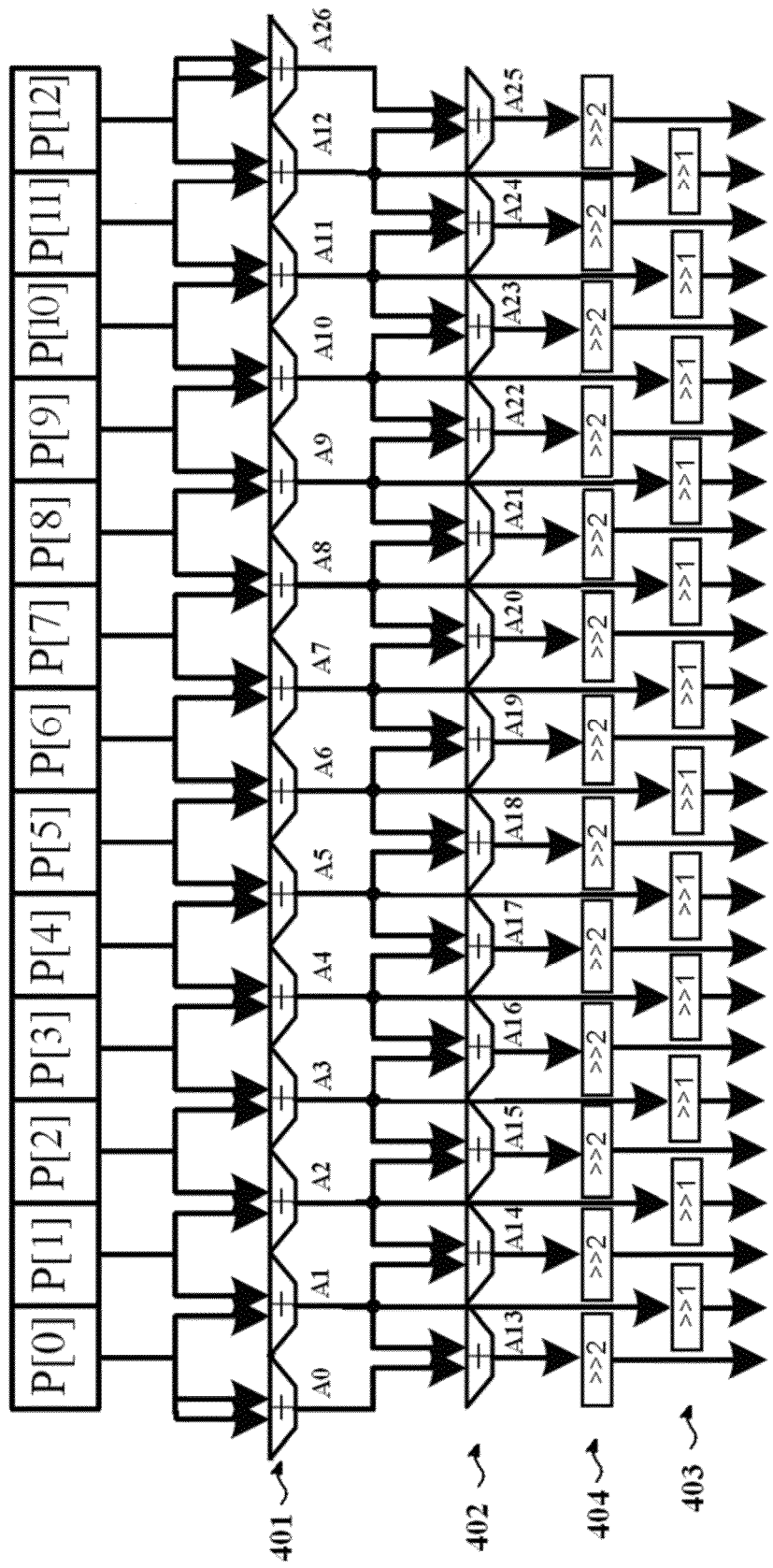
Figure 4C:
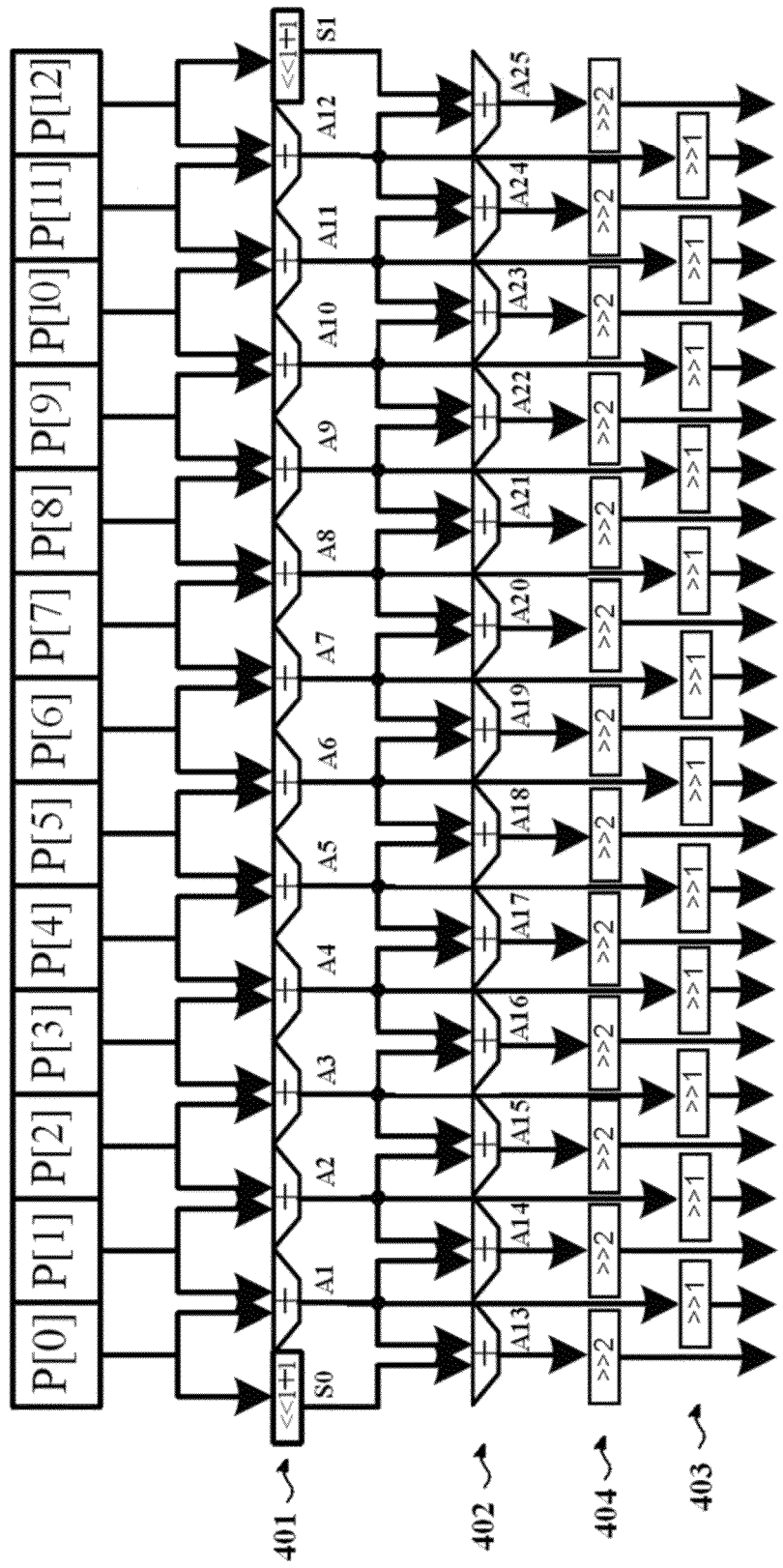

Referring next to FIGS. 4a through 4c, shown is two exemplary datapaths for an I4×4 block applying a method of implementing the intra prediction calculation according to the present invention. The datapath supports eight (8) prediction modes of an I4×4 block except for DC mode (computations for Horizontal and Vertical modes will be described further below). As shown in FIG. 4a through 4c, there are thirteen (13) available neighboring pixels for an I4×4 block, and the pixel values of these 13 neighboring pixels are successively identified as P[0] to P[12] respectively. These available neighboring pixel values are input to the first level adders 401, i.e., A1 to A12 in parallel and in an order as shown in FIG. 4b. As shown in FIG. 4b, adder A1 computes the sum of P[0] and P[1], adder A2 computes the sum of P[1] and P[2], and so on, and adder 12 computes the sum of P[11] and P[12]. Then utilizing the adder's carry-in function, the computation of the portion "(P[n−1]+P[n]+1)" of equation (1) is completed by the first level of adders. The results of the first level adders are directly output to the first shifting unit 403 at the bottom of the datapath, and the results are right shifted by 1 bit. As a result, the computation of equation (1) is accomplished, and the results are output accordingly. Simultaneously, the results of the first level adders 401 (adder A1 to A12) are output to the second level adders 402 (adder A13 to A25), respectively. As shown in FIG. 4b, the result of adder A1 is output to A13 and A14 respectively, the result of adder A2 is output to A14 and A15 respectively, and so on. Consequently, the second level adders 402 use the results of the first level adders 401 to perform the portion "{(P[n−1]+P[n]+1)+(P[n]+P[n+1]+1)}" of equation (2'). The results of the second level adders 402 (adder A13 to A25) are output to the second shifting unit 404 and a right shifting by 2 bits is performed therein. As a result, the computation of equation (2') is completed and the results are output accordingly.

As shown in FIG. 4b, the end values of neighboring pixels P[0] and P[12] are input to adders A0 and A26 to carry out the computation according to equations (3) and (4). Equation (3) may be transformed to following equation (3'):

$$\text{Predictor}=\{(2*P[0]+1)-(P[0]+P[1]+1)\}>>2 \qquad (3')$$

Wherein Predictor is a predicted value for a pixel, (2*P[0]+1) is obtained by the computation of adder A0 with carry-in function, and "(P[0]+P[1]+1)" is obtained by the computation of adder A1. Both of the results, "(2*P[0]+1)" and "(P[0]+P[1]+1)", are input to adder A13, A13 carries out the adding computation to obtain "{(2*P[0]+1)+(P[0]+P[1]+1)}". Next, the result of the adder A13 is input to the second shifting unit 404 and is right-shifted by 2 bits, and then the computation of equation (3') is completed as a result.

The computation of equation (4) is similar to that of equation (3). Equation (4) may be transformed to following equation (4'):

$$\text{Predictor}=\{(P[\text{Max}-1]+P[\text{Max}]+1)+(2*P[\text{Max}]+1)\}>>2 \qquad (4')$$

Wherein Predictor is a predicted value for a pixel, "(2*P[Max]+1)" (Max=12 in this example) is obtained by the computation of adder A26 with carry-in function, and "(P[Max−1]+P[Max]+1)" is obtained by the computation of adder A12. Both of the results, "(2*P[Max]+1)" and "(P[Max−s]+P[Max]+1)" are input to adder A25 to obtain "{(P[Max−1]+P[Max]+1)+(2*P[Max]+1)}". Next, the result of the adder A25 is input to the second shifting unit 404 and is right-shifted by 2 bits, and then the computation of equation (4') is completed as a result.

FIG. 4c shows an alternative form of the datapath shown in FIG. 4b, in which the adders A0 and A26 are replaced by shifters S0 and S1 having much simpler structure than the adders, in order to decrease complexity of the circuit layout and the chip real estate area cost. The computation of (2*P[0]+1) can be implemented with following manner: firstly, to left-shift P[0] by 1 bit in shifter S0 to obtain a result of 2*P[0], then to set compulsorily the lsb (least significant bit) of above result to one (1) to obtain (2*P[0]+1) since the lsb will be "0" consequently after left-shifting by 1 bit. The computation of (2*P[Max]+1) by shifter S1 is similar to (2*P[0]+1).

As stated above, the datapath shown in FIGS. 4b and 4c may be used to perform the computation of equations (1) to (4) and therefore provide the intra prediction pixel values for an I4×4 block under various prediction modes except for the DC mode. The datapath carries out the idea of using only two levels of addition. Due to the combination of many identical and redundant computations, only 27 adders or 25 adders with a small amount of logical shifters are needed to implement this datapath. The computing speed for intra prediction using this datapath is enhanced significantly without much increase in the area cost.

Exemplary Embodiment 2

Figure 5:
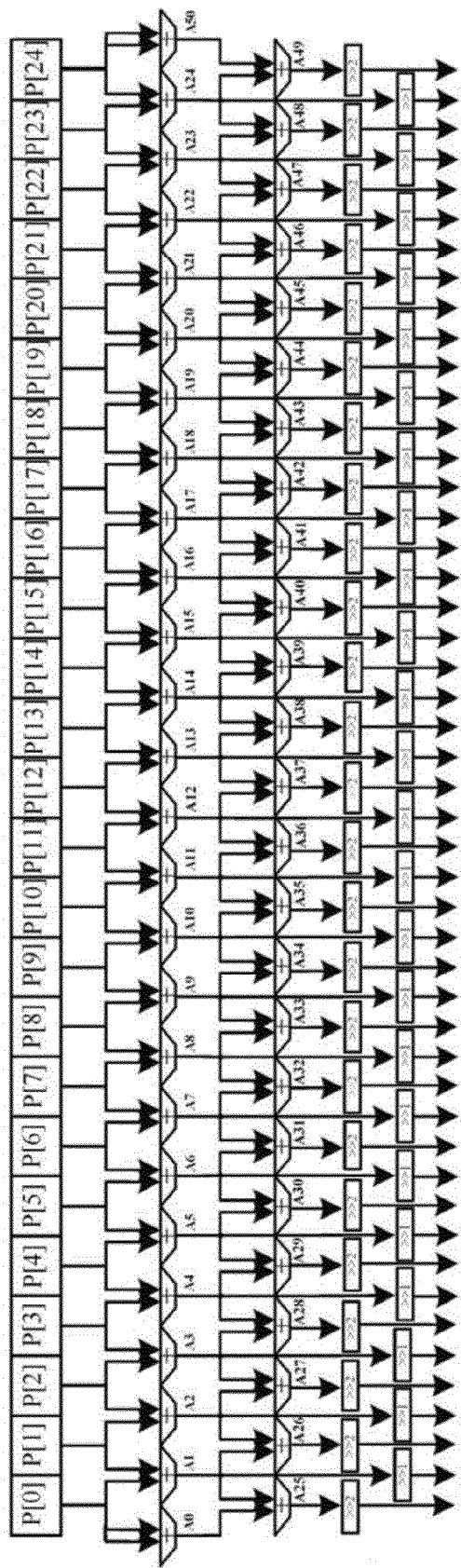
FIG. 5 shows the datapath for an I8×8 block applying a method of implementing the intra prediction calculation according to the present invention.

Referring next to FIG. 5, shown is the datapath for an I8×8 block applying a method of implementing the intra prediction calculation according to the present invention. The computing process of an I8×8 block is similar to that of an I4×4 block described in exemplary embodiment 1, and the only difference is that the number of neighboring pixels for an I8×8 block is 25 instead of 13 in an I4×4 block, denoted by P[0] to P[24] in FIG. 5.

Similar to the exemplary embodiment 1, it will be appreciated by those skilled in the art that the adders A0 and A50 in FIG. 5 can be replaced by the shifters to implement the computation of equations (3') and (4').

Exemplary Embodiment 3

It is possible to make the layout of the circuit quite regular and convenient with the architecture of the datapath according to the present invention. At same time, some existing units in the datapath can be used to implement other computations in the H.264 standard by simply adding only a few extra units.

Figure 6:
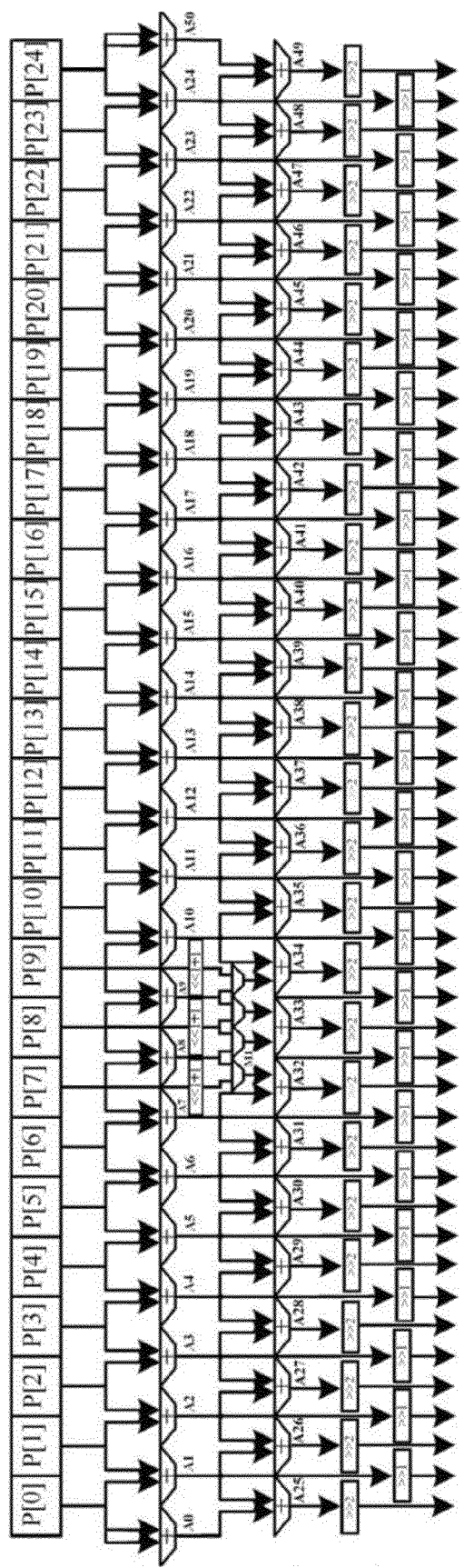
FIG. 6 shows the datapath for an I8×8 block reference filtering applying a method of implementing the intra prediction calculation according to the present invention.

Referring next to FIG. 6, shown is the datapath for an I8×8 block reference filtering applying a method of implementing the intra prediction calculation according to the present invention. FIG. 6 shows a datapath for an I8×8 block reference filtering computation based on the datapath implementing the intra prediction for an I8×8 block described in exemplary embodiment 2 and FIG. 5. According to the H.264 standard, the equations used in reference filtering are listed below:

If all of the values of neighboring pixels are available, then $$\text{Predictor}[n]=(P[n-1]+2*P[n]+P[n+1]+2)>>2$$

$$\text{Predictor}[0]=(3*P[0]+P[1]+2)>>2$$

$$\text{Predictor}[24]=(P[23]+3*P[24]+2)>>2$$

If the value of neighboring pixel P[8] is not available, then $$\text{Predictor}[7]=(P[6]+3*P[7]+2)>>2$$

$$\text{Predictor}[9]=(P[10]+3*P[9]+2)>>2$$

If the value of neighboring pixel P[7] is available and P[9] is not available, then $$\text{Predictor}[8]=(P[7]+3*P[8]+2)>>2$$

If the value of neighboring pixel P[7] is not available and P[9] is not available, then $$\text{Predictor}[8]=(P[9]+3*P[8]+2)>>2$$

Through the observation of the above equations, the function of reference filtering is given special treatment when neighboring pixels P[7], P[8] and P[9] are not available, but the form of the equations used for reference filtering are same as equations (2), (3) and (4).

As shown in FIG. 6, based on the intra prediction computation for an I8×8 block of exemplary embodiment 2, the neighboring pixels P[7], P[8] and P[9] are directly input to three logical shifting-units which perform a left shifting operation by 1 bit and plus 1, and the results of these left-shifting units are input to adders A32, A33 and A34 in the second level adders through the multiplexers M1. When conducting intra prediction computation for an I8×8 block according to exemplary embodiment 2, the multiplexers M1 do not select the output of the logical shifting units, so the datapath has the same function as that in exemplary embodiment 2. When the datapath is used for reference filtering, the only change is to select the output of the logical shifting units through controlling the multiplexers M1. For example, if the value of neighboring pixel P[7] is available and P[9] is not available, the adder A8 in the first level adders carries out the addition of "P[7]+P[8]+1", the result of which is input to the one input of adder A33 in the second level adders through the second multiplexer from the left in the multiplexers M1. The other input of adder A33 is the result of P[8] being left shifted by 1 bit which has been selected by the third multiplexer from the left in the multiplexers M1, i.e. 2*P[8], then to set compulsorily the lsb (least significant bit) of above result to one (1) to obtain "2*P[8]+1". The adder A33 calculates the sum of "P[7]+P[8]+1" and "2*P[8]+1" and outputs the result "P[7]+3*P[8]+2". Lastly, the reference filtering value of Predictor [8] is obtained after right shifting the result of adder A33 by 2 bits and the computation of equation "Predictor[8]=(P[7]+3*P[8]+2)>>2" is completed.

Therefore, by only adding three logical shifters which perform a left shifting operation by 1 bit and plus 1 and four multiplexers to the datapath providing intra prediction computation for an I8×8 block, the new datapath may implement both the intra prediction computation and reference filtering functions. Of course, similar with exemplary embodiment 1, the shifters performing left shifting by 1 bit and plus 1 may be replaced by an adder.

Exemplary Embodiment 4

Figure 7A:
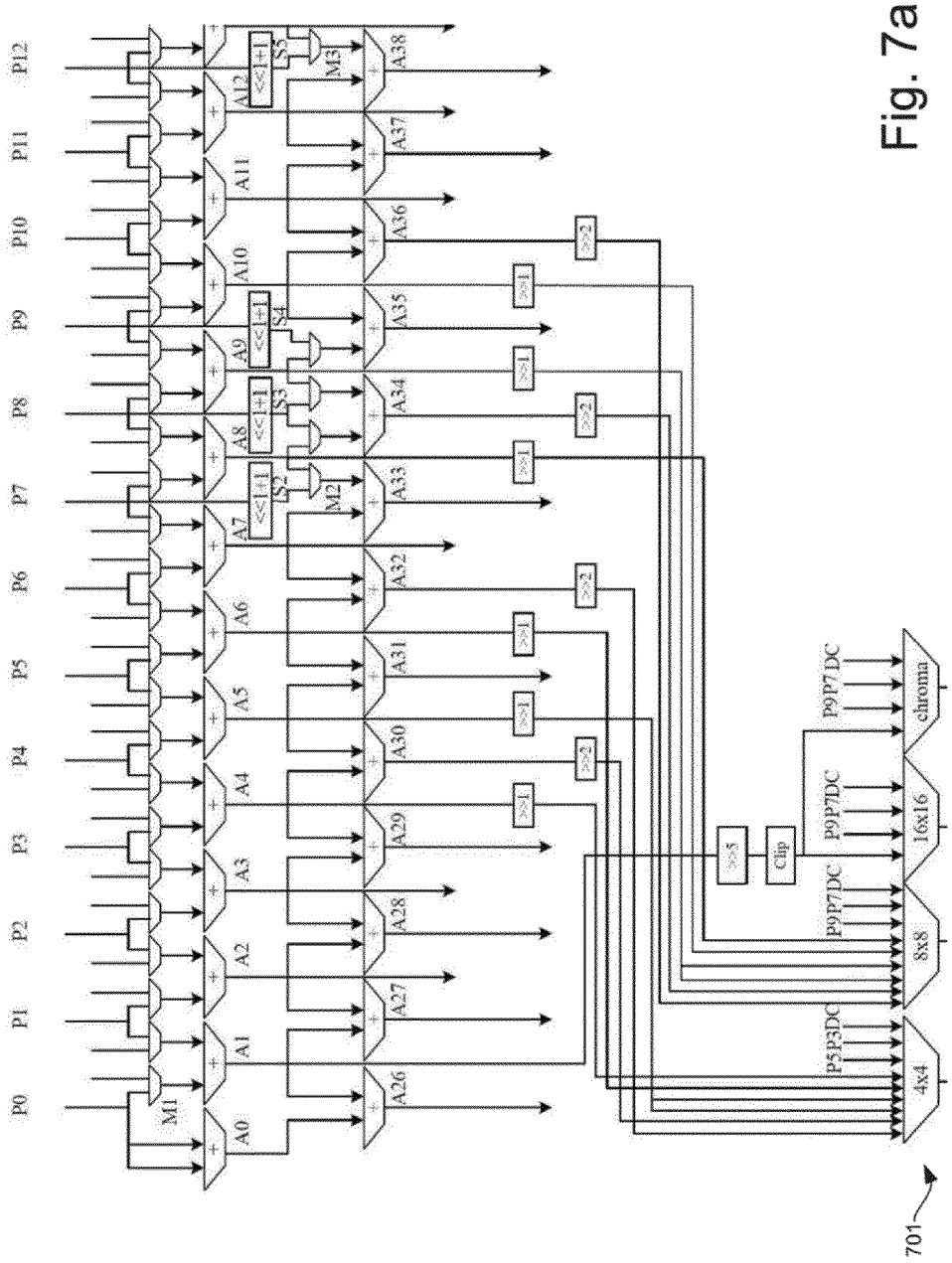
FIGS. 7a through 7c are diagrams each showing a partial view of the datapath which can implement the calculations for eight (8) prediction modes for an I4×4 block, eight (8) prediction modes for an I8×8 block, I8×8 block reference filtering, and Horizontal, Vertical and Plane prediction modes for both a an I16×16 block and an I8×8 chroma block.
Figure 7B:
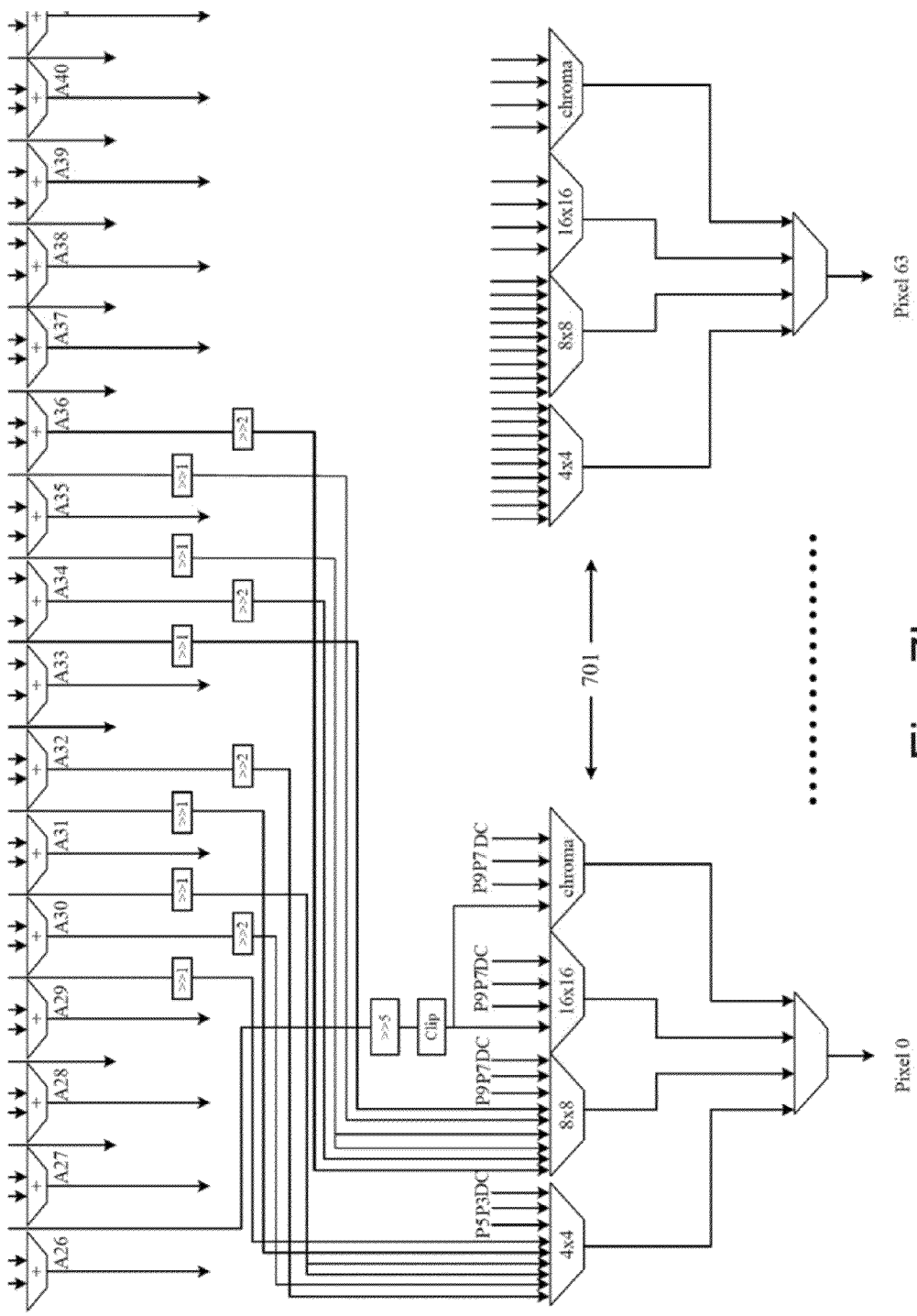
Figure 7C:
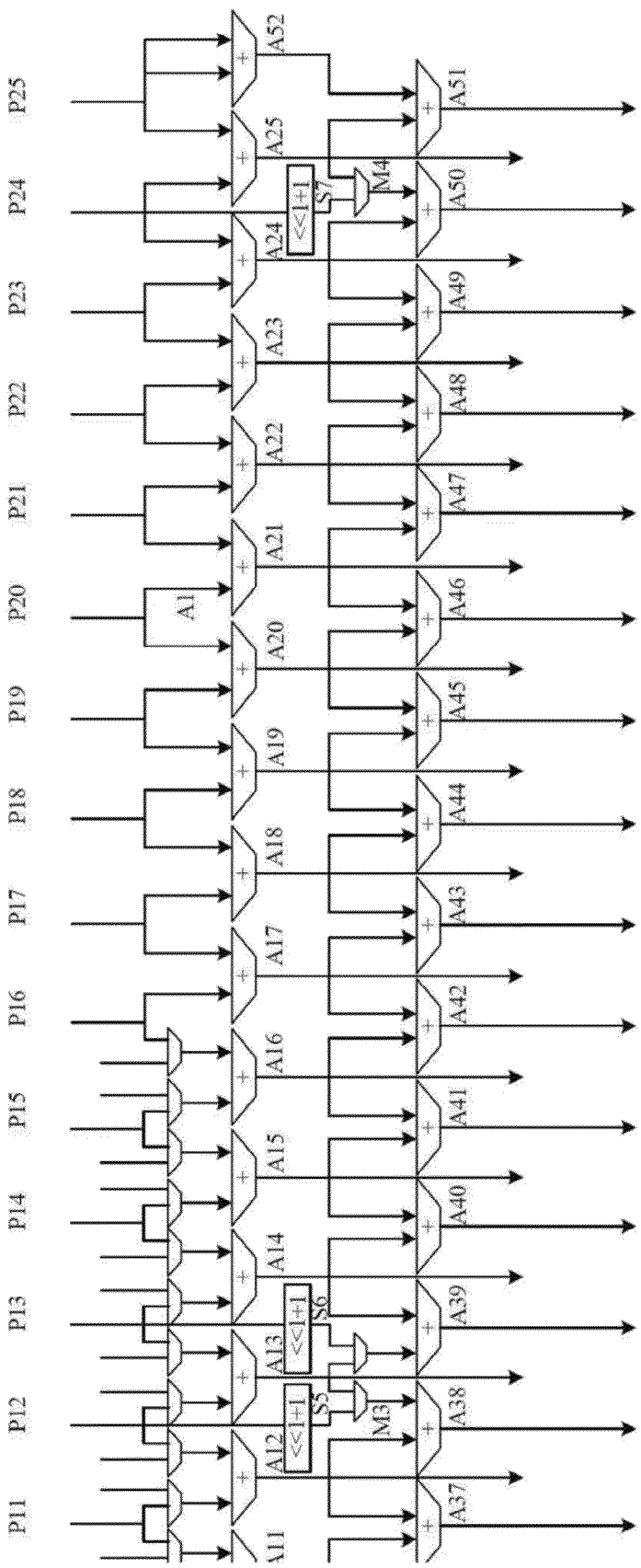

Referring next to FIGS. 7a through 7c, shown are diagrams each illustrating a partial view of the datapath which can implement the calculations for eight (8) prediction modes for an I4×4 block, eight (8) prediction modes for an I8×8 block, I8×8 block reference filtering, and Horizontal, Vertical and Plane prediction modes for all of an I4×4 block, an I8×8 block, I16×16 block and an I8×8 chroma block. The datapath can generate intra predicted values for at most 64 pixels simultaneously.

As shown in FIGS. 7a through 7c, the datapath comprises a first level of adders A0 to A25 and A52 (shown in FIGS. 7a and 7c), a second level of adders A26 to A51 (shown in FIGS. 7a and 7c), six shifting units S2 through S7 (shown in FIGS. 7a and 7c), performing the operation of left shifting by 1 bit and setting lsb to 1, and multiplexers 701 (shown in FIGS. 7a and 7b). The connections between these components are shown in FIG. 7a through 7c. The datapath implements computation of 8 prediction modes for two I4×4 blocks at the same time. In the datapath, adders A0 to A12, A26 to A38 and logical shifter S5 together compose one datapath for one I4×4 block, which is similar with the datapath in exemplary embodiment 1; and adders A14 to A25, A39 to A52, and logical shifter S6 together compose another datapath for one I4×4 block. The computation of intra prediction modes for I4×4 blocks can be implemented by controlling the related multiplexers M1 and M3 to select corresponding datapath as described in exemplary embodiment 1 and FIG. 4b.

When computing the intra prediction for an I8×8 block, the datapath is composed of adders A0 to A24, A27 to A51, together with logical shifter S7. The computation of intra prediction for I8×8 block can be implemented by controlling the related multiplexers M1 and M4 to select corresponding datapath as described in exemplary embodiment 2 and FIG. 5.

When computing I8×8 block reference filtering values, the datapath is composed of adders A0 to A24, A27 to A51, together with logical shifters S2 to S4 and S7. The computation of I8×8 block reference filtering can be implemented by controlling the related multiplexers M1 and M2 to select corresponding datapath as described in exemplary embodiment 3 and FIG. 6.

The computation of Horizontal, Vertical and Plane modes for I4×4, I8×8, I16×16 blocks or a chroma block is discussed below.

Computation of Horizontal, Vertical, Plane and DC Mode

According to the algorithms in the H.264 standard with reference to FIG. 1, for Horizontal mode, all of the predicted pixels lining up in the same horizontal direction take the value of its neighboring pixel on the left side. For Vertical mode, all of the predicted pixels lining up in the same vertical direction take the value of its neighboring pixel on the top. Therefore, the computation of Horizontal and Vertical modes only needs the assigning the value of neighboring pixels directly to the predicted pixel to complete, without any further computation. Reflecting on the datapath, the extracted value of neighboring pixels may be directly routed to the pixel value selection and assignment unit. Therefore, although not expressly shown in FIG. 4b to FIG. 7c, the datapaths in exemplary embodiments 1, 2, 3 and 4 can all implement the computation of Horizontal and Vertical mode for I4×4 blocks, I8×8 blocks or I16×16s block by simply adding connection lines from the input neighboring pixel to the output selection and assignment unit.

With respect to Plane mode and DC mode, the algorithms provided by the H.264 standard are not the same as aforementioned equations (1)-(4). Therefore, the computation for Plane and DC modes do not employ the idea of "two level of additions" as in the present invention. However, it is apparent to a person of ordinary skill in the art that a complete intra prediction computation can be implemented by combining any existing datapath designed to implement the computation of Plane and DC mode with the exemplary embodiments 1 to 4 of the present invention.

For example, for computing predicted pixel values in Plane mode for an I16×16 block, the algorithms provided by the H.264 standard are as following:

$$\text{Predictor} = a + 15 + b*n + c*m + 1 \quad (5)$$

Wherein Predictor is a predicted value for a pixel, n=−7 . . . 8, m=−7 . . . 8

$$a = 16 * p[-1, 15] + 16 * p[15, -1]$$

$$b = (5 * H + 32) >> 6$$

$$c = (5 * V + 32) >> 6$$

$$H = \sum_{x'=0}^{7} [(x' + 1) * p[8 + x', -1] - (x' + 1) * p[6 - x', -1]]$$

$$V = \sum_{y'=0}^{7} [(y' + 1) * p[-1, 8 + y'] - (y' + 1) * p[-1, 6 - y']]$$

Since the computation in equation (5) also includes some additions, in order to enhance the hardware utility, some of adders in the datapath of the present invention may be shared to compute Plane mode prediction by adding multiple multiplexers. FIG. 7a through 7c show an example of such a hardware share. As shown in FIGS. 7a through 7c, by controlling the corresponding multiplexers M1, adders A1-A16 are used to implement the partial addition in equation (5). It will be certainly understood that when the shared adders perform the Plane mode computation, the bit width of the shared adder should be 16 bits wide.

The intra prediction method according to the present invention is suitable for image data with various bit rates, such as 8 bits, 16 bits or 32 bits. Accordingly, the bit width of the first level of adders/adding operation may be 8 bits, 16 bits or 32 bits respectively, and the bit width of the second level of adders/adding operation is 9 bits, 17 bits or 33 bit respectively.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application to thereby enable others skilled in the art to best utilize the invention and various embodiments with various modifications as are suited to the particular use are contemplated. The scope of the invention is to be defined by the claims appended hereto and their equivalents.

What is claimed is:

1. A method, comprising:
selecting an image block to be intra-predicted;
extracting neighboring pixel values of the image block;
determining a prediction mode of the image block;
performing a first adding operation on the neighboring pixel values when the prediction mode is one of Diagonal_Down_Left, Diagonal_Down_Right, Vertical_Right, Horizontal_Down, Vertical_Left, or Horizontal_Up;
performing a first shifting operation on a result of the first adding operation;
performing a second adding operation on the result of the first adding operation;
performing a second shifting operation on a result of the second adding operation;
receiving, at a selection unit, the results of the first shifting operation and the second shifting operation; and
selecting for output, by the selection unit, a corresponding value from the results of the first shifting operation and the second shifting operation according to the prediction mode and a size of the image block;
wherein the second adding operation is performed according to the following equations:

$$\text{Predictor} = P[n-1] + 2*P[n] + P[n+1] + 2(\text{if } n=1, \ldots, \text{Max}-1)$$

$$\text{Predictor} = 3*P[0] + P[1] + 2(\text{if } n=0)$$

$$\text{Predictor} = P[\text{Max}-1] + 3*P[\text{Max}] + 2(\text{if } n=\text{Max});$$

wherein Predictor is a predicted value for a pixel, P[n] is a value of a neighboring pixel, n=0, ..., Max, denoting each neighboring pixel from a bottom left corner to an upper right corner of the image block;
wherein if a value of neighboring pixel P[8] is not available, then:
Predictor[7]=(P[6]+3*P[7]+2) >>2; and
Predictor[9]=(P[10]+3*P[9]+2) >>2.

2. The method of claim 1, wherein the first adding operation is performed according to the following equation:

$$\text{Predictor} = P[n-1] + P[n] + 1$$

wherein Predictor is another predicted value for the pixel, P[n] is a value of the neighboring pixel, n=0, ..., Max, denoting each neighboring pixel from the bottom left corner to the upper right corner of the image block.

3. The method of claim 1, wherein the first shifting operation is to right-shift by 1 bit.

4. The method of claim 1, wherein the second shifting operation is to right-shift by 2 bits.

5. The method of claim 1 further comprising a step of calculating another predicted value for another pixel based on the neighboring pixel values when the prediction mode is one of Horizontal, Vertical, DC, and Plane mode.

6. The method of claim 1, wherein a bit width of the first adding operation is one of 8 bits, 16 bits, or 32 bits.

7. The method of claim 1, wherein a bit width of the second adding operation is one of 9 bits, 17 bits, or 33 bits.

8. A circuit device, comprising:
a neighboring pixel extracting unit configured to extract neighboring pixel values of an image block to be intra-predicted;
a mode determining unit configured to determine whether a prediction mode of the image block is one of Diagonal_Down_Left, Diagonal_Down_Right, Vertical_Right, Horizontal_Down, Vertical_Left, or Horizontal_Up;
a first adding operation unit configured to perform a first adding operation using the neighboring pixel values as inputs;
a first shifting unit configured to perform a first shifting operation on a result of the first adding operation unit;
a second adding operation unit configured to perform a second adding operation using the result of the first adding operation unit;
a second shifting unit configured to perform a second shifting operation on a result of the second adding operation unit; and
a selecting and assigning unit configured to receive the results of the first shifting unit and the second shifting unit, and select for output a corresponding value from the results of the first shifting unit and the second shifting unit according to the prediction mode and a size of the image block;
wherein the circuit device is operable such that the second adding operation is performed according to the following equations:

$$\text{Predictor} = P[n-1] + 2*P[n] + P[n+1] + 2(\text{if } n=1, \ldots, \text{Max}-1)$$

$$\text{Predictor} = 3*P[0] + P[1] + 2(\text{if } n=0)$$

$$\text{Predictor} = P[\text{Max}-1] + 3*P[\text{Max}] + 2(\text{if } n=\text{Max});$$

wherein Predictor is a predicted value for a pixel, P[n] is a value of a neighboring pixel, n=0, ..., Max, denoting each neighboring pixel from a bottom left corner to an upper right corner of the image block;
wherein the circuit device is operable such that if a value of neighboring pixel P[8] is not available, then:
Predictor[7]=(P[6]+3*P[7]+2) >>2; and
Predictor[9]=(P[10]+3*P[9]+2) >>2.

9. The circuit device of claim 8, wherein the first adding operation unit is configured to calculate an equation as follows:

$$\text{Predictor} = P[n-1] + P[n] + 1$$

wherein Predictor is another predicted value for the pixel, P[n] is a value of the neighboring pixel, n=0, ..., Max, denoting each neighboring pixel from the bottom left corner to the upper right corner of the image block.

10. The circuit device of claim 8, wherein the first shifting unit is configured to perform right-shifting by 1 bit.

11. The circuit device of claim 8, wherein the second shifting unit is configured to perform right-shifting by 2 bits.

12. The circuit device of claim 8, further comprising a Horizontal, Vertical, DC, and Plane mode process unit.

13. The circuit device of claim 8, wherein adders in the first adding operation unit are adders with a carry-in function.

14. The circuit device of claim 8, wherein a bit width of the first adding operation unit is one of 8 bits, 16 bits, or 32 bits.

15. The circuit device of claim 8, wherein a bit width of the second adding operation unit is one of 9 bits, 17 bits, or 33 bits.

16. A system, comprising:
a graphics processing unit comprising a circuit device implementing an intra prediction computation applied to an H.264 video coding standard, the circuit device comprising the following operatively connected units:
 a neighboring pixel extracting unit configured to extract neighboring pixel values of an image block to be intra-predicted;
 a mode determining unit configured to determine whether a prediction mode of the image block is one of Diagonal_Down_Left, Diagonal_Down_Right, Vertical_Right, Horizontal_Down, Vertical_Left, or Horizontal_Up;
 a first adding operation unit configured to perform a first adding operation using the neighboring pixel values as inputs;
 a first shifting unit configured to perform a first shifting operation on a result of the first adding operation unit;
 a second adding operation unit configured to perform a second adding operation using the result of the first adding operation unit;
 a second shifting unit configured to perform a second shifting operation on a result of the second adding operation unit; and
 a selecting and assigning unit configured to receive the results of the first shifting unit and the second shifting unit, and select for output a corresponding value from the results of the first shifting unit and the second shifting unit according to the prediction mode and a size of the image block;
wherein the system is operable such that the second adding operation is performed according to the following equations:

Predictor $=P[n-1]+2*P[n]+P[n+1]+2$ (if $n=1,\ldots,$ Max$-1$)

Predictor $=3*P[0]+P[1]+2$ (if $n=0$)

Predictor $=P[\text{Max}-1]+3*P[\text{Max}]+2$ (if $n=\text{Max}$);

wherein Predictor is a predicted value for a pixel, P[n] is a value of a neighboring pixel, n=0, . . . , Max, denoting each neighboring pixel from a bottom left corner to an upper right corner of the image block;
wherein the system is operable such that if a value of neighboring pixel P[8] is not available, then:
Predictor[7]=(P[6]+3*P[7]+2)>>2; and
Predictor[9]=(P[10]+3*P[9]+2)>>2.

17. The system of claim 16 further comprising a graphics card to which the graphics processing unit is operatively connected.

18. A method, comprising:
selecting an image block to be intra-predicted;
extracting neighboring pixel values of the image block;
determining a prediction mode of the image block;
performing a first adding operation on the neighboring pixel values when the prediction mode is one of Diagonal_Down_Left, Diagonal_Down_Right, Vertical_Right, Horizontal_Down, Vertical_Left, or Horizontal_Up;
performing a first shifting operation on a result of the first adding operation;
performing a second adding operation on the result of the first adding operation;
performing a second shifting operation on a result of the second adding operation;
receiving, at a selection unit, the results of the first shifting operation and the second shifting operation; and
selecting for output, by the selection unit, a corresponding value from the results of the first shifting operation and the second shifting operation according to the prediction mode and a size of the image block;
wherein the second adding operation is performed according to the following equations:

Predictor $=P[n-1]+2*P[n]+P[n+1]+2$ (if $n=1,\ldots,$ Max$-1$)

Predictor $=3*P[0]+P[1]+2$ (if $n=0$)

Predictor $=P[\text{Max}-1]+3*P[\text{Max}]+2$ (if $n=\text{Max}$);

wherein Predictor is a predicted value for a pixel, P[n] is a value of a neighboring pixel, n=0, . . . , Max, denoting each neighboring pixel from a bottom left corner to an upper right corner of the image block;
wherein if a value of neighboring pixel P[7] is available and a value of neighboring pixel P[9] is not available, then:
Predictor[8]=(P[7]+3*P[8]+2)>>2.

19. A method, comprising:
selecting an image block to be intra-predicted;
extracting neighboring pixel values of the image block;
determining a prediction mode of the image block;
performing a first adding operation on the neighboring pixel values when the prediction mode is one of Diagonal_Down_Left, Diagonal_Down_Right, Vertical_Right, Horizontal_Down, Vertical_Left, or Horizontal_Up;
performing a first shifting operation on a result of the first adding operation;
performing a second adding operation on the result of the first adding operation;
performing a second shifting operation on a result of the second adding operation;
receiving, at a selection unit, the results of the first shifting operation and the second shifting operation; and
selecting for output, by the selection unit, a corresponding value from the results of the first shifting operation and the second shifting operation according to the prediction mode and a size of the image block;
wherein the second adding operation is performed according to the following equations:

Predictor $=P[n-1]+2*P[n]+P[n+1]+2$ (if $n=1,\ldots,$ Max$-1$)

Predictor $=3*P[0]+P[1]+2$ (if $n=0$)

Predictor $=P[\text{Max}-1]+3*P[\text{Max}]+2$ (if $n=\text{Max}$);

wherein Predictor is a predicted value for a pixel, P[n] is a value of a neighboring pixel, n=0, . . . , Max, denoting each neighboring pixel from a bottom left corner to an upper right corner of the image block;
wherein if a value of neighboring pixel P[7] is not available and a value of neighboring pixel P[9] is not available, then:
Predictor[8]=(P[9]+3*P[8]+2)>>2.

* * * * *